United States Patent [19]

Steigerwald et al.

[11] Patent Number: 5,781,421
[45] Date of Patent: Jul. 14, 1998

[54] HIGH-FREQUENCY, HIGH-EFFICIENCY CONVERTER WITH RECIRCULATING ENERGY CONTROL FOR HIGH-DENSITY POWER CONVERSION

[75] Inventors: Robert Louis Steigerwald, Burnt Hills; Sriram Ramakrishnan, Clifton Park, both of N.Y.

[73] Assignee: General Electric Company, Schenectady, N.Y.

[21] Appl. No.: 767,463

[22] Filed: Dec. 16, 1996

[51] Int. Cl.[6] .......................... H02M 3/335; H02M 7/00; H02M 7/537
[52] U.S. Cl. .................. 363/21; 363/131; 363/65
[58] Field of Search .................. 363/20-21, 46-49, 363/131-133, 65, 71, 97; 323/266

[56] References Cited

U.S. PATENT DOCUMENTS

| | | | |
|---|---|---|---|
| 4,788,634 | 11/1988 | Schlecht et al. | 363/21 |
| 5,274,539 | 12/1993 | Steigerwald et al. | 363/20 |
| 5,576,940 | 11/1996 | Steigerwald et al. | 363/20 |
| 5,661,642 | 8/1997 | Shimashita | 363/21 |
| 5,675,485 | 10/1997 | Seong | 363/97 |

*Primary Examiner*—Peter S. Wong
*Assistant Examiner*—Bao Q. Vu
*Attorney, Agent, or Firm*—Jill M. Breedlove; Douglas E. Stoner

[57] ABSTRACT

A front-end converter processes only a fraction (e.g., about 10%) of the power delivered by an efficient output (i.e., the main) converter in order to control the output voltage thereof. Because only a fraction of the delivered power is processed, the losses associated with the front-end converter are a very small fraction of the total delivered power, leading to very high overall efficiencies. The input power to the front-end converter is provided from the output of the main converter; this reduced power is thus circulated within the converter. Regulation of the output voltage by controlling the dc voltage relieves the regulating function from the main converter, allowing the main converter to be selected strictly on the basis of efficiency and small size. The result is an overall efficient, compact dc-to-dc converter with minimal output filter requirements and protection against output short circuits. Additionally, the converter bandwidth is determined by the bandwidth of the low-power front-end converter which can have a higher bandwidth than a full-rated converter. Therefore, a significantly higher bandwidth can be achieved as compared with presently available converters, advantageously resulting in a reduced output filter size and faster speed of response.

15 Claims, 2 Drawing Sheets

HIGH-FREQUENCY, HIGH-EFFICIENCY CONVERTER WITH RECIRCULATING ENERGY CONTROL FOR HIGH-DENSITY POWER CONVERSION

FIELD OF THE INVENTION

The present invention relates generally to power converters and, more particularly, to a high-frequency dc-to-dc converter with recirculating energy control for high-efficiency operation suitable for distributed power applications.

BACKGROUND OF THE INVENTION

Some converters, such as soft-switched interleaved forward converters, have characteristics which allow for efficient compact power conversion. Such characteristics include the following: zero-voltage switching operation (i.e., switching with substantially zero voltage across switching devices); constant frequency switching operation; and device voltage stresses that are independent of load. Unfortunately, however, soft-switched interleaved forward converters are not able to control output voltage; such a converter simply converts the input voltage to the output voltage, the ratio being determined by the transformer turns ratio. In order to regulate the output voltage, the input voltage must be controlled. The problem is to control this input voltage with a "front-end" converter (i.e., another converter at the input of the main converter) that is as efficient as possible and to provide suitable protection for the main converter.

In U.S. Pat. No. 5,274,539 of R. L. Steigerwald and R. A. Fisher, issued Dec. 28, 1993, the entire power is converted twice, once by a front-end converter and once by the output converter, thereby reducing efficiency. In U.S. Pat. No. 4,788,634 of Schlecht et al., issued Nov. 29, 1988, a partial power conversion has been proposed which uses a reduced power boost converter for control. Disadvantageously, however, the forward converter of Schlecht et al. must sink current and, like other front-end converters, uses additional energy to operate.

Accordingly, it is desirable to control the output voltage of a dc-to-dc converter by controlling the dc bus feeding the converter as efficiently as possible. Furthermore, to achieve high efficiency, it is desirable to process only a fraction of the total delivered power in order to control the total power. In addition, it is desirable to provide short circuit protection for the entire converter even though only a fraction of the power is controlled by the front-end regulator.

SUMMARY OF THE INVENTION

A front-end converter processes only a fraction (e.g., about 10%) of the power delivered by an efficient output (i.e., main) converter in order to control the output voltage thereof. Because only a fraction of the delivered power is processed, the losses associated with the front-end converter are a very small fraction of the total delivered power, leading to very high overall efficiencies. The input power to the front-end converter is provided from the output of the main converter; this reduced power is thus circulated within the converter. Regulation of the output voltage by controlling the dc voltage relieves the regulating function from the main converter, allowing the main converter to be selected strictly on the basis of efficiency and small size. The result is an overall efficient, compact dc-to-dc converter with minimal output filter requirements and protection against output short circuits. Additionally, the converter bandwidth is determined by the bandwidth of the low-power front-end converter which can have a higher bandwidth than a full-rated converter. Therefore, a significantly higher bandwidth can be achieved as compared with presently available converters, advantageously resulting in a reduced output filter size.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
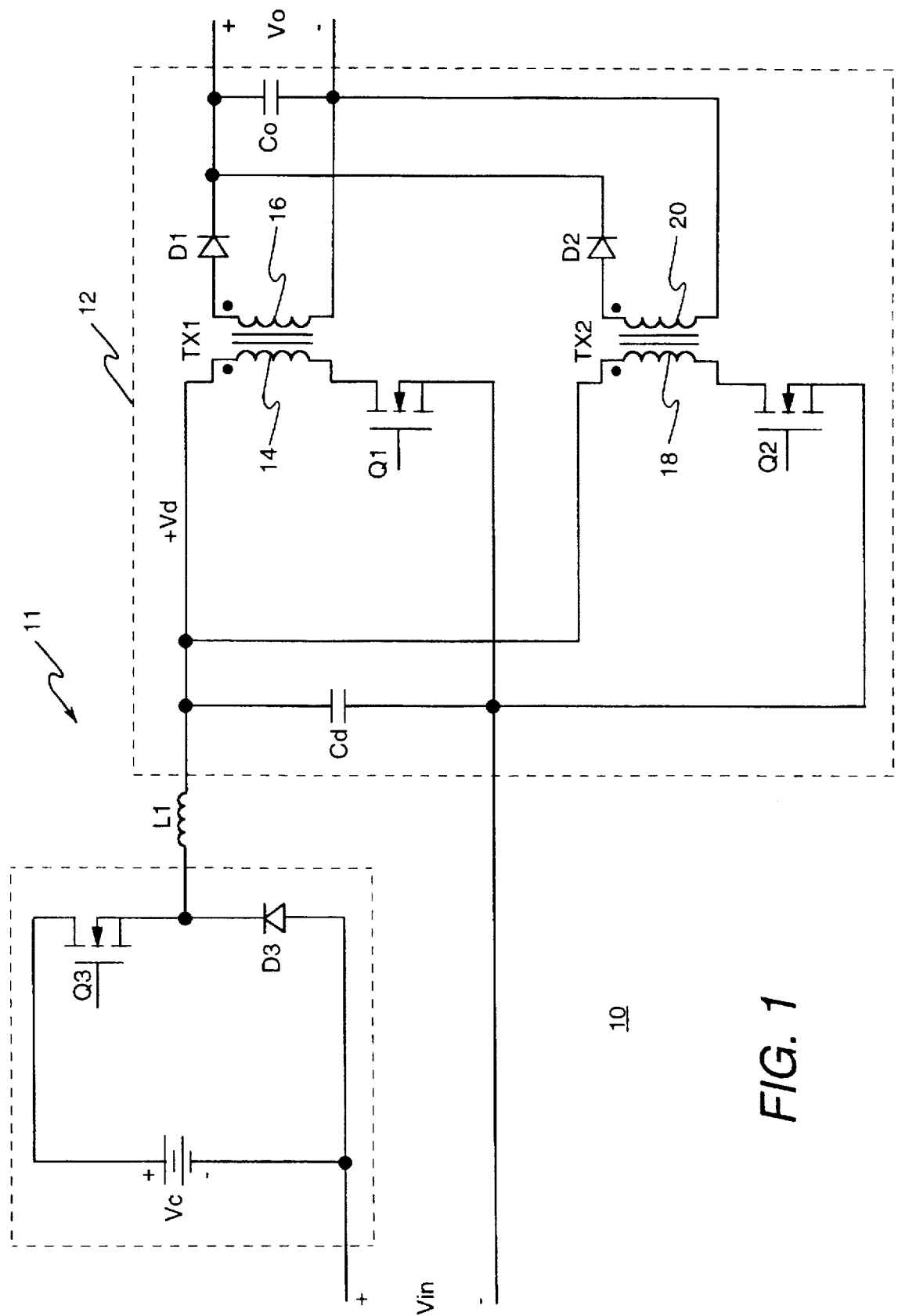
FIG. 1 schematically illustrates an interleaved forward converter with low-power front-end control in accordance with the present invention.

FIG. 1 illustrates an interleaved forward converter 10 with low-power front-end control 11 and a soft-switched dual forward converter 12 in accordance with the present invention. Dual forward converter 12 includes a series connection of a first switching device Q1 and a primary winding 14 of a first transformer TX1 coupled in parallel with an energy-storage capacitor Cd. A secondary winding 16 of transformer TX1 is coupled in parallel, through a diode rectifier D1, with a small high-frequency output filter capacitor Co. Converter 12 further comprises a series connection of a second switching device Q2 and a primary winding 18 of a second transformer TX2 coupled in parallel with energy-storage capacitor Cd. A secondary winding 20 of transformer TX2 is coupled in parallel, through a diode rectifier D2, with output filter capacitor Co. Transformers TX1 and TX2 have substantially the same turns ratio. By way of example, Q1 and Q2 are illustrated as power FET's.

Dual forward converter 12 directly transformer couples a dc link voltage Vd to the output through transformer TX1 to produce the output voltage Vo. Switch Q1 is driven at approximately a 50% duty cycle. Similarly, switch Q2 is driven at a 50% duty cycle to transformer couple Vd to the output Vo. However, Q2 is driven 180° out of phase with respect to Q1 so that either TX1 or TX2 directly transforms the dc link bus to the output bus. In this manner, the filter requirements of output filter capacitor Co are minimized. The output capacitor only needs to filter any high-frequency switching noise; ideally, it needs to filter only a small amount at the rectification frequency because the dc link capacitor Cd is directly transformer coupled to the output by the square of the transformer turns ratio. This property of the converter makes it very desirable for low output voltage converters (e.g., 3.3 Vdc and less) where the low voltage filter requirements can otherwise be excessive. In addition, switches Q1 and Q2, as well as diodes D1 and D2, are zero-voltage switched in order to minimize switching losses, thereby allowing high-frequency operation and hence small passive component sizes.

Without the front-end control 11 according to the present invention, which will be explained in detail hereinafter, a problem with the dual forward converter 12 is that the output voltage Vo cannot be regulated by controlling the switches Q1 and Q2. The dc bus voltage Vd must be controlled in order to regulate the output voltage bus. As described hereinabove, this is usually done by putting a full-rated dc-to-dc converter ahead of the main converter, thereby controlling the bus Vd and hence the output voltage Vo.

In accordance with the present invention, the hereinabove described disadvantages of dual forward converter 12 (as well as other converters) are overcome by using a front-end control 11 which uses a fraction of the total power to control the bus Vd. In the illustrated embodiment of FIG. 1, control 11 comprises a dc-to-dc buck regulator comprising a series connection of a switch Q3 and a diode D3 coupled in parallel with a relatively low auxiliary voltage Vc. The auxiliary voltage Vc is "stacked" on top of the input voltage Vin and supplies the small auxiliary buck converter. The junction between switch Q3 and the cathode of diode D3 is connected to one terminal of a filter inductor L1, the other terminal of which is connected to the dc link voltage Vd.

In operation, when the buck switch Q3 is on, diode D3 is back-biased, and the current in dc inductor L1 flows through Vc and the source voltage Vin. When Q3 is off, current flows through inductor L1, diode D3, and the source voltage Vin. Current in the source is thus essentially dc, the only ripple being that in the inductor L1.

In an exemplary distributed power system, Vin may be 48±2 Vdc. In such case, Vc may be selected to be on the order of 7 Vdc, for example. Therefore, by controlling the duty cycle of Q3, the dc bus voltage Vd would be regulated around 51 Vdc, and Vd is controlled to regulate the output voltage Vo. Note that the output voltage of the buck regulator is a relatively low average voltage (e.g., 2–5 Vdc) in series with the main input dc voltage. Thus, the average power delivered by Vc is typically approximately 10–15% of the total power, leading to low losses relative to the total power delivered, i.e., typically a few per cent. Also note that the ripple voltage across inductor L1 is only that produced by the low voltage buck regulator, rather than the full 48 Vdc input voltage. Thus, while carrying the full input current, the inductor value is on the order of ten times smaller due to the reduced ripple voltage. Furthermore, switch Q3 and diode D3 only have to block the low dc voltage Vc, allowing for the use of low-voltage, small and efficient semiconductor devices.

The converter bandwidth is determined by the bandwidth of the low-power front-end converter 11. The front-end converter can have a higher bandwidth than a full-rated converter because it can switch at significantly higher frequencies due to its lower power level. Therefore, significantly higher bandwidths can be achieved as compared with presently available converters, leading to faster speed of response and reduced output filter size.

Figure 2:
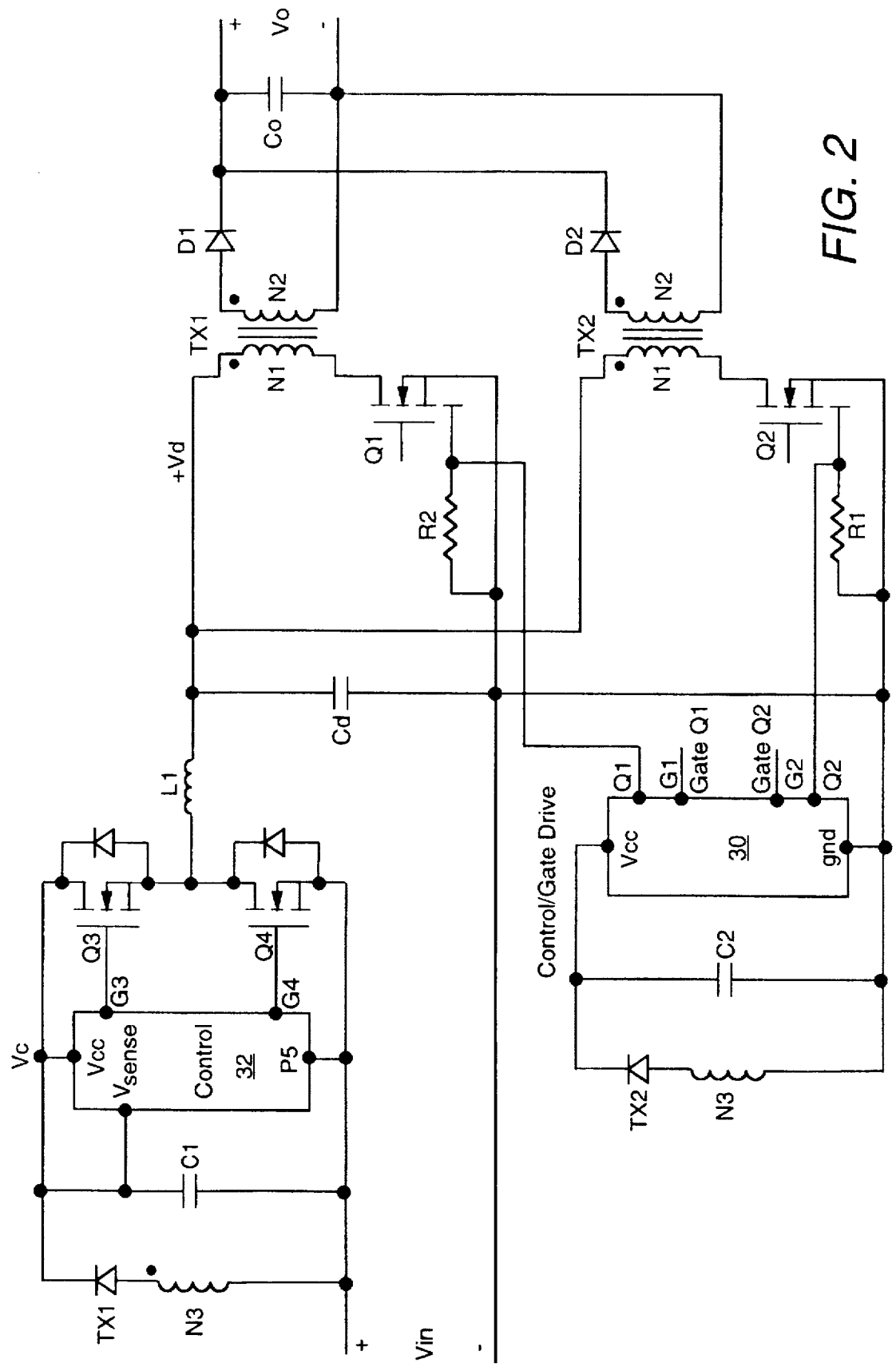
FIG. 2 schematically illustrates recirculation of energy to provide auxiliary power in a power conversion scheme according to the present invention.

While it is possible that two voltages (e.g., Vin and Vc) could be distributed to each converter in a specialized distributed power system, the more general case is only a single voltage distribution, i.e., Vin, illustrated in FIG. 2 in accordance with the present invention. As illustrated, the voltage Vc is obtained from a third winding N3 on the output transformer TX1. In the embodiment of FIG. 2, gate drive control 30 is illustrated for providing gating signals to switches Q1 and Q2, and gate drive control 32 is illustrated for providing gating signals to switches Q3 and Q4. In addition, as shown in FIG. 2, diode D3 has been replaced by a switching device Q4 (i.e., FET) to form a synchronous buck converter in order to increase the efficiency of the buck regulator 11 still further. In particular, Q4 acts as a synchronous rectifier (i.e., a low on-resistance FET having a conduction voltage drop which is less than a diode voltage drop) in order to increase efficiency.

In operation, once Q1 and Q2 start switching with an input voltage near Vin, the voltage Vc is established and the Vc control chip is powered, causing the voltage Vd to rise somewhat above Vin as the output voltage becomes regulated. If winding N3 is tightly coupled to winding N2, then the voltage across N3 will be proportional to the output voltage, i.e., the voltage across winding N2. Thus, the voltage Vc is proportional to the output voltage and can be used as a feedback signal Vsense to control the output voltage in some applications.

The auxiliary voltage Vc can be obtained from either or both secondary windings N3 of transformers TX1 and TX2. In the embodiment shown in FIG. 2, one transformer secondary winding N3 is used to power the buck regulator and the other transformer secondary winding N3 is used to power the control and gate drive circuit of the interleaved forward converter.

Also illustrated in FIG. 2 is a current limit control implemented by using a current sensing power FET as the main converting switching devices Q1 and Q2. Suitable current sensing power FET's are of a type sold under the trademark SenseFET by Motorola, or of a type referred to as Hexsense devices sold by International Rectifier. Without the current sensing power FET's, if a short circuit were to appear at the output, nothing would limit the current from the source Vin if Q1 and Q2 were to continue to switch. The current sensing power FET's allow the current in each FET to be sensed instantaneously, and if an overcurrent is sensed by either or both sensing resistors R1 and R2, the corresponding gate drive is immediately removed to protect the converter.

The control chips for Q1 and Q2 are very simple. It merely has to provide a constant frequency gate drive and must be able to turn off if an overcurrent is sensed. A typical control chip that can be used is a Motorola MC33066 chip which is capable of running up to 2 MHz.

Advantageously, therefore, the present invention provides a highly efficient dc-to-dc converter suitable for distributed power applications which accomplishes voltage control by controlling only a small portion of the converted power by using a simple low voltage buck regulator (or other type of regulator). In addition, the converter obtains its auxiliary voltage in a simple manner by recirculating energy from the converter output. Minimal filtering is required at the output such that the converter is suitable for either low noise output applications or very low voltage output applications (e.g., 3.3 Vdc and less). Further, the converter has simple control requirements. And, by employing current sensing power FET's as the output converter switching devices, the converter provides instantaneous overcurrent protection. Still further, the converter is suitable for implementation in a multichip module due to its minimum number of full power rated magnetic components; that is, it has minimum magnetic energy storage requirements and only the equivalent of one full-rated magnetic element. As yet another advantage, a high bandwidth can be achieved since the low-power front-end converter determines bandwidth, leading to a reduced output filter size and faster speed of response.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A dc-to-dc converter, comprising:

a main dc-to-dc switching converter for converting a dc link voltage to an output dc voltage; and a front-end converter for regulating the dc link voltage such that the output dc voltage is regulated, the front-end converter comprising a controlled auxiliary voltage having a value equivalent to a portion of the output voltage, the dc link voltage being derived from the auxiliary voltage in conjunction with the input voltage, the auxiliary voltage being derived by recirculating energy from the main converter.

2. The converter of claim 1 wherein the main switching converter comprises at least one transformer for coupling the dc link voltage to the output dc voltage.

3. The converter of claim 2 wherein the at least one transformer has an additional secondary winding for deriving the auxiliary voltage.

4. The converter of claim 3 wherein the additional secondary winding is sufficiently tightly coupled to the other corresponding transformer windings such that the auxiliary voltage is proportional to the output voltage.

5. The converter of claim 4 wherein the auxiliary voltage comprises a feedback signal for controlling the output voltage.

6. The converter of claim 1 wherein the main converter comprises a dual forward converter comprising two parallel-connected switching circuits, each switching circuit comprising a switching device connected in series with the primary winding of an output transformer.

7. The converter of claim 6 wherein each output transformer has an additional secondary winding, the auxiliary voltage being derived from the output voltage from either or both additional secondary windings.

8. The converter of claim 6 wherein each output transformer has an additional secondary winding, one additional secondary winding supplying the dual forward converter and the other additional secondary winding supplying control and gate drive circuitry of the front-end converter.

9. The converter of claim 1 wherein the front-end converter comprises a buck regulator.

10. The converter of claim 9 wherein the front-end converter comprises a switching device connected in series with a diode, the series connection being coupled across the auxiliary voltage.

11. The converter of claim 1 wherein the front-end converter comprises a synchronous buck converter.

12. The converter of claim 1, further comprising current limit control for limiting current from the input voltage source in the event of short circuit at the output.

13. The converter of claim 12 wherein the current limit control comprises current sensing power FET's in the main converter for instantaneously sensing current in the respective switching devices.

14. The converter of claim 1 wherein the bandwidth thereof is determined by the bandwidth of the front-end converter.

15. The converter of claim 1 wherein the main converter and front-end converter are operated in a zero-voltage switching mode.

* * * * *